United States Patent [19]

Ju et al.

[11] Patent Number: 5,497,258
[45] Date of Patent: Mar. 5, 1996

[54] SPATIAL LIGHT MODULATOR INCLUDING A VLSI CHIP AND USING SOLDER FOR HORIZONTAL AND VERTICAL COMPONENT POSITIONING

[75] Inventors: Teh-Hua Ju; Yung-Cheng Lee; Wei Lin, all of Boulder, Colo.

[73] Assignee: The Regents of the University of Colorado, Boulder, Colo.

[21] Appl. No.: 250,182

[22] Filed: May 27, 1994

[51] Int. Cl.⁶ .................... G02F 1/1333; G02F 1/1343
[52] U.S. Cl. ............................................ 359/83; 359/88
[58] Field of Search ................................ 359/88, 87, 83

[56] References Cited

U.S. PATENT DOCUMENTS

| | | | |
|---|---|---|---|
| 4,127,321 | 11/1978 | Koyama et al. | 359/88 |
| 4,796,977 | 1/1989 | Drake | 359/88 |
| 4,867,543 | 9/1989 | Bennion et al. | 350/384 |
| 5,073,010 | 12/1991 | Johnson et al. | 359/72 |
| 5,130,830 | 7/1992 | Fukushima et al. | 359/72 |
| 5,221,989 | 6/1993 | Stappaerts | 359/323 |
| 5,381,307 | 1/1995 | Hertz et al. | 361/767 |

FOREIGN PATENT DOCUMENTS

| | | | |
|---|---|---|---|
| 54-98630 | 8/1979 | Japan | 359/88 |
| 59-116723 | 7/1984 | Japan | 359/88 |
| 61-6626 | 1/1986 | Japan | 359/88 |
| 63-254419 | 10/1988 | Japan | 359/88 |

Primary Examiner—William L. Sikes
Assistant Examiner—Charles Miller
Attorney, Agent, or Firm—F. A. Sirr; E. C. Hancock

[57] ABSTRACT

A Spatial Light Modulator (SLM) includes a Ferroelectric Liquid Crystal (FLC) layer that is contained in a thin gap or cavity between an upper cover glass and a lower Very Large Scale Integration (VLSI) Complementary Metal Oxide Semiconductor (CMOS) chip. The circuits on the VLSI/CMOS chip are wire connected to an underlying substrate member. A selected volume and vertical height of medium and small size solder joints between the VLSI chip and the substrate member produce self aligning of the VLSI chip with the underlying substrate member during solder reflow. These solder joints also produce an upward directed force that urges the VLSI chip in an upward direction away from the substrate member during solder reflow. A selected volume and vertical height of large size solder joints between the substrate member and the cover glass produce a downward directed force that urges the cover glass in a downward direction during solder reflow. Mechanical spacers separate the cover glass from the VLSI chip and establish the cavity or gap that is filled by the FLC layer. Electronic circuits formed in the VLSI chip are wire bonded to the underlying substrate member by way of wire bonds that extend along all four sides of the chip. The cover glass provides a four-sided cavity to accommodate the four-sided wire bonding. A fluxless soldering technique is used.

38 Claims, 5 Drawing Sheets

SPATIAL LIGHT MODULATOR INCLUDING A VLSI CHIP AND USING SOLDER FOR HORIZONTAL AND VERTICAL COMPONENT POSITIONING

Research relating to this invention was supported by the National Science Foundation (NSF) under grant number ECD-9015128.

BACKGROUND OF THE INVENTION

1. Field of the Invention

This invention relates to the field of Spatial Light Modulators (SLMs). More specifically, this invention relates to liquid crystal SLMs, SLM fabrication processes, and SLM packaging methods wherein a cover glass, a semiconductor circuit chip, such as a VLSI chip, and a substrate member are jointed together in a controlled and accurate positional relationship. Devices of this type are sometimes called silicone backplane liquid crystal SLMs wherein detectors, electronic logic, and modulators are integrated into a single device.

2. Description of Related Art

As is well known, SLMs are generally used to impress information on an optical wavefront. Specific uses include coherent optical processing applications, data routing, data input to optical processing systems, high definition visual information display, optical pattern correlators, optoelectronic processing systems, and optical image processing.

Ferroelectric Liquid Crystals (FLCs) have been used in SLMs because of the high birefringence and low voltage operation that is provided by this type of liquid crystal. The properties of FLCs allow large pixel arrays to be constructed that operate at gigabit per second data rates.

It has been suggested that FLC/SLM pixel array devices (i.e., an X-Y coordinate system array of individual pixels) be constructed and arranged using a semiconductor circuit chip to provide the multiple circuit elements that control the state of the multi- pixel FLC layer (i.e., control the state of the FLC layer in the areas of the individual pixels of the SLM array). For example, U.S. Pat. No. 5,073,010 by K. M. Johnson et al, incorporated herein by reference, describes an optically-addressable SLM wherein the SLM's light-sensitive member comprises an integrated circuit substrate that includes a discrete photosensitive area, processing electronics, and a metal crystal modulating pad for each pixel of the SLM, the metal pads being in physical contact with the corresponding pixel areas of a distorted helix FLC.

Another example of the use of a semiconductor substrate in a SLM is U.S. Pat. No. 5,130,830 wherein a spatial light modulator includes a ferroelectric liquid crystal confined between two alignment films and in a cavity that is established by spacers, and wherein a semiconductor substrate includes a photodiode.

A feature of the invention includes the use of solder reflow to produce device alignment. A feature of this general type is shown, for example, in U.S. Pat. No. 4,867,543 wherein a spatial light modulator includes an integrated circuit structure that is aligned to an adjacent modulator array by way of solder bumps, these solder bumps also functioning as circuit connections. U.S. Pat. No. 5,221,989 is also of general interest relative to this feature in that it describes the use of flip chip solder bonds in a SLM using ceramic PLZT.

While the work of others has been generally satisfactory for the limited stated purposes, the art has failed to provide a SLM, or a SLM fabrication technique, wherein the liquid crystal cavity, or gap that exists between a cover glass and a semiconductor chip, is provided in the range of a micron thick, with submicron gap uniformity throughout the cavity. In addition, a structure and arrangement that facilitates use of all four sides of the semiconductor chip for wire bonding to an underlying substrate member has not been provided.

SUMMARY OF THE INVENTION

This invention relates to liquid crystal SLMs, SLM fabrication processes, and SLM packaging methods wherein a cover glass, a liquid crystal layer, a semiconductor circuit chip, and a substrate member are jointed together in a controlled and accurate positional relationship by the selective use of different size solder pads to produce alignment and positioning forces during reflow of the solder joints. More specifically, an SLM, in accordance with the invention, includes a VLSI chip and a cover glass that are mounted relative to a substrate member using solder reflow forces to achieve both horizontal and vertical component positioning.

While the invention will be described in detail while making reference to Electrically Addressable Spatial Light Modulator (EASLM) embodiments which translate information from the electrical domain to the optical domain, the invention also finds utility with other types of SLMs, such as optically addressable SLMs. An exemplary SLM in accordance with the invention comprises a symmetrically square 64×64 pixel array whose individual pixels are located on 40 micrometer by 40 micrometer centers.

In an embodiment of the invention, the SLM included a FLC layer that is contained in a thin cavity that exists between an upper cover glass and a lower VLSI semiconductor chip. The lower glass surface that faces the cavity is covered by a thin, optically transparent, and electrically conductive electrode coating of Indium Tin Oxide (ITO). The crystal pixel modulating circuits on the VLSI chip are wire connected, or bonded, to an underlying substrate member.

The volume and vertical height of medium and small size solder joints that exist between the VLSI chip and the substrate member produce self alignment of the VLSI chip to the underlying substrate member during solder reflow, and also produce an upward-directed force that urges the VLSI chip in an upward direction away from the substrate member during solder reflow.

The volume and vertical height of large size solder joints that exist between the substrate member and the cover glass produce self alignment of the cover glass to the substrate member during solder reflow, and also produce a downward directed force that urges the cover glass in a downward direction during solder reflow.

The above-described solder reflow forces operate to achieve a uniform micro meter level gap for the liquid crystal, and align the cover glass, the VLSI chip, and the substrate.

Mechanical spacers separate the cover glass from the VLSI chip, and establish a thin cavity that is filled by the FLC layer. The circuits on the VLSI chip are wire bonded to circuit paths that are carried by the substrate member. The resulting SLM can be used to generate a visual image by using the VLSI circuits to selectively switch the individual pixels of the FLC layer that lies in a cavity between the cover glass and the VLSI chip.

In accordance with a feature of the invention, the lower side of the cover glass (i.e., the side that faces the VLSI chip)

is provided with a four-sided groove, or cavity, that allows the circuits on the VLSI chip to be wire bonded to circuit paths on the substrate member by way of wire bonding that covers all four sides of the VLSI chip.

In accordance with a feature of the invention, a fluxless soldering procedure is used. A utility of the invention is the production of many liquid crystal SLMs using one solder reflow step in a low cost batch assembly process.

The invention provides a new and an unusual SLM assembly technology, whereby a FLC-on-VLSI SLM is produced using the reflow forces produced by solder joints to position and align the critical elements of the SLM. Solder reflow self-alignment forces pull the SLM's cover glass against the VLSI by way of a compliant surface tension force that can accommodate different surface and contact conditions. Thus, the thin gap that is filled with a FLC layer, which is in the range of a micron thick and has submicron uniformity, is established as the cover glass is forced down onto mechanical spacers that are carried by the VLSI chip.

These and other objects, features and advantages will be apparent to those of skill in the art upon reference to the following detailed description, which description makes reference to the drawing.

DESCRIPTION OF THE PREFERRED EMBODIMENTS

Figure 1:
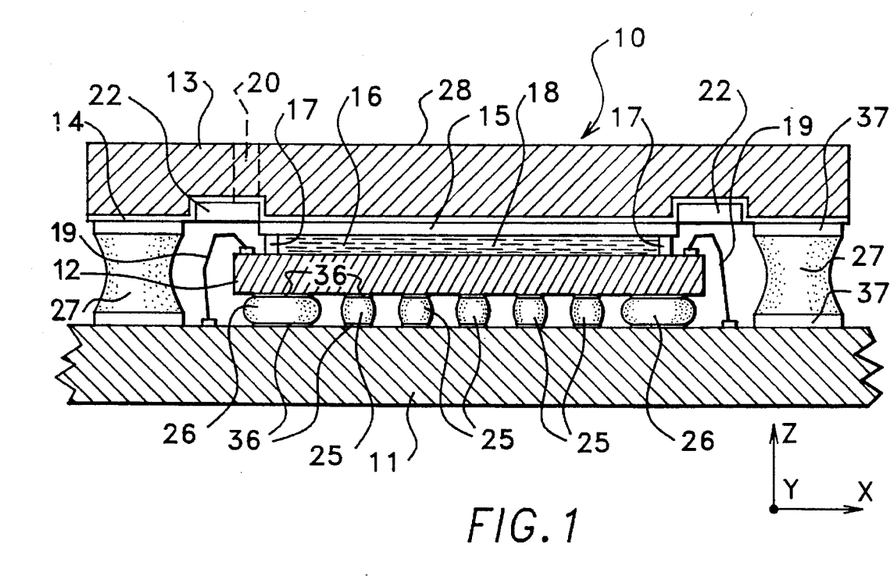
FIG. 1 is a cross-section side view of a VLSI SLM constructed and arranged in accordance with the invention.

FIG. 1 is a cross-section side view of a VLSI SLM 10 constructed and arranged in accordance with the invention. For example, SLM 10 comprises a 64×64 pixel X-Y array that is generally square and measures about 6 mm on each side. SLM 10 includes a lower substrate member 11, a VLSI chip 12, a liquid crystal layer 16, and an optically transparent cover glass or optical flat 13. Substrate member 11 may be a silicon wafer having a plated wire pattern on the upper surface thereof. While a 64×64 pixel array is described, larger arrays, such as a 128×128 pixel array or a 256×256 pixel array, are within the spirit and scope of the invention.

Cover glass 13 carries an electrically conductive ITO layer 14 and a crystal alignment layer 15 on the lower surface of cover glass 13, and an antireflective coating 28 may be placed on the top surface of cover glass 13.

Figure 4:
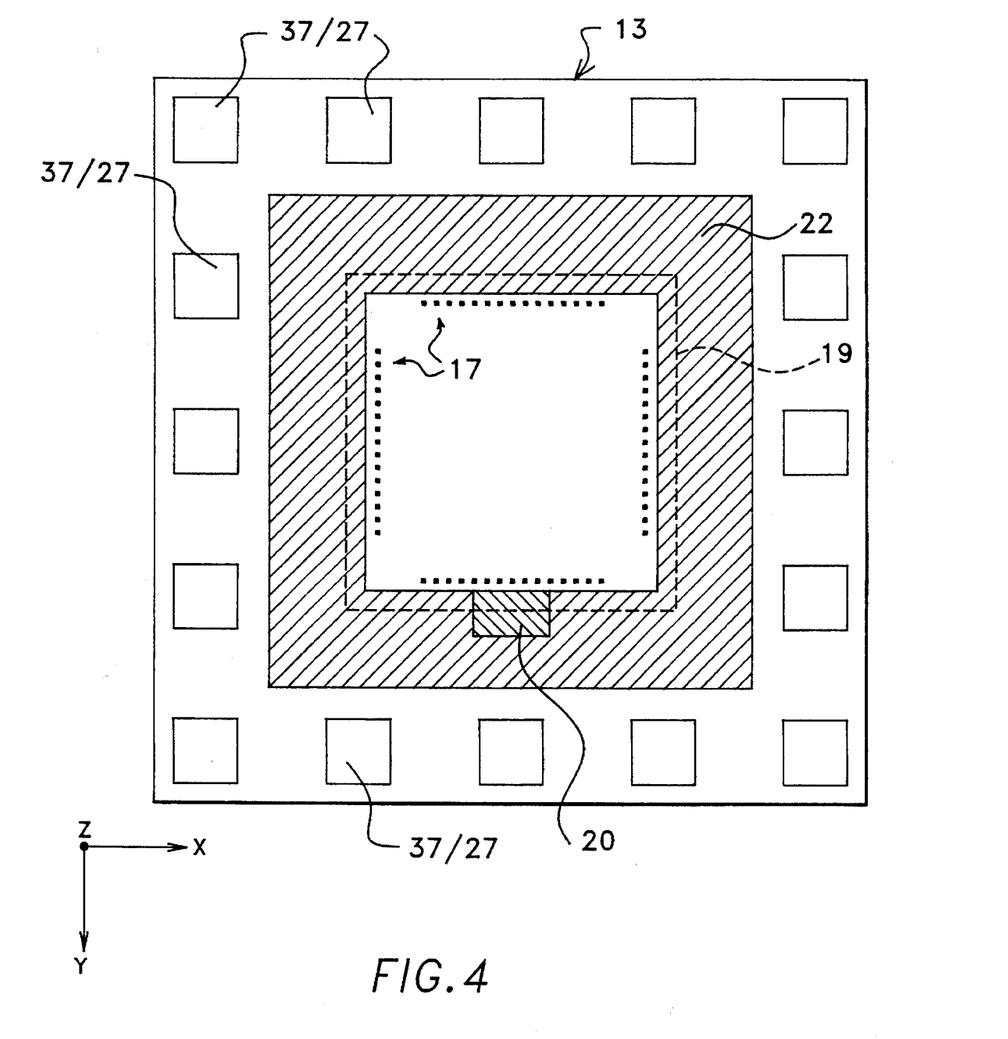
FIG. 4 is a bottom view of the cover glass shown in side section view in FIG. 1, showing (1) the four-sided channel or groove that allows all four sides of the VLSI chip of FIG. 1 to be used to achieve wire bonding to the underlying substrate member, (2) the liquid crystal cavity spacers that establish the thickness of the liquid crystal cavity in FIG. 1, (3) the liquid crystal filling hole of FIG. 1, and (4) sixteen solder wettable pads and large size solder joints that are used both to achieve alignment of the cover glass to the substrate member, and to provide a downward-directed force on the cover glass to establish a cavity for the liquid crystal layer.

In addition, cover glass 13 carries a number of individual mechanical spacers 17. While spacers, such as polyimide or glass spheres or glass rods can be used, in accordance with a feature of the invention, spacers 17 are formed by a photolithograhic/etching process. More specifically, the bottom surface of cover glass 13 is coated with a light-sensitive coating, the coating is illuminated and then developed to form the pattern of spacers 17, and the developed coating is removed, to thereby leave a pattern of spacers 17 that operate to establish the Z-direction height of cavity 18 for liquid crystal layer 16. FIG. 4 provides another view of spacers 17.

Electrical connection is provided to ITO layer 14. For example, a circuit pattern on the upper surface of substrate member 11 connects to ITO layer 14 through large size solder joints 27.

In an embodiment of the invention, crystal alignment layer 15 comprised a $SiO_2$ layer or, more generally, alignment layer 15 comprised an obliquely-evaporated $SiO_x$ layer, or alignment layer 15 comprised a layer of polyvinyl alcohol, or alignment layer 15 was formed by rubbing polymer coated glass; for example, PVA or PBT coated glass with a cloth.

Liquid crystal layer 16 may comprise a smectic C* FLC that provides binary modulation, or it may comprise a ferroelectric liquid crystal, as is described in U.S. Pat. No. 4,367,924 to N. A. Clark, incorporated herein by reference.

While a single upper crystal alignment layer 15 is shown in FIG. 1, it is within the spirit and scope of the invention to also provide a lower crystal alignment layer.

In accordance with the invention, wires or wire bonds 19 are provided on all four sides of VLSI chip 12 to connect the individual pixel circuits of chip 12 to the circuit paths (not shown) that are carried by substrate 11. This feature of the invention of utilizing all four sides of VLSI chip 12 for wire bonding is made possible by the new and unusual provision of a four-sided groove 22 that is formed in the lower surface of cover glass 13. This unique construction feature of cover glass 13 is better shown in FIG. 4.

While not critical to the invention, the X direction rows of SLM array 10 may be addressed by using a dynamic shift register, and the Y direction columns of the array may be addressed in parallel by dividing the array into a number of column areas, and using plurality of data lines to address the columns of the array in each data processing cycle.

A filling hole 20 is provided, whereby liquid crystal material may be inserted into cavity 18, in a vacuum environment, in order to form liquid crystal layer 16.

As a feature of the invention, hole 20 is selected to be of a size to hold a quantity of FLC paste necessary to fill cavity 18. The SLM assembly is then placed in a vacuum environment, and the assembly is heated. As a result, the FLC paste is converted to a liquid-like consistency. Due to the phenomenon of capillary attraction, this heated liquid crystal material preferentially flows through gaps between spacers 17 and into FLC cavity 18, as shown at 16 in FIG. 1. Hole 20 is then sealed by use of an appropriate sealing process and material. The assembly is then cooled. The resulting FLC layer 16 is a few wavelengths thick relative to the wavelength of the reading wavefront. In an embodiment of the invention, SLM 10 operated as a zero order half-wave retarder in reflection at a wavelength of about 700 nm, which is consistent with a layer thickness for FLC layer 16 of about 1.0 micrometer.

As will be described relative to FIG. 2, many small size solder joints 25, for example, thirty-six small size solder joints and four symmetrically-placed medium size solder joints 26, operate during SLM assembly and as a result of solder reflow forces, to align chip 12 in the X-Y plane relative to substrate member 11. As stated, this precise alignment is achieved by virtue of wettable solder pads 36 that are formed on the adjacent surfaces of VSLI chip 12 and substrate member 11. In addition, solder joints 25,26 operate to generate an upward Z direction force relative to substrate member 11 during solder reflow.

Sixteen symmetrically-placed large size solder joints 27 operate during SLM assembly, and as a result of solder reflow forces, to align cover glass 13 to substrate member 11, again by virtue of the accuracy of placement of solder wettable pads 37, and to generate a downward Z direction force relative to substrate member 11 during solder reflow. As a result of these solder reflow forces, cover glass 13 is accurately aligned to substrate member 11 in the X-Y plane, chip 12 is accurately aligned to substrate member in the X-Y plane, and the Z direction height of cavity 18 is accurately established.

In an embodiment of the invention, the forces necessary to establish this alignment and height control were achieved by selecting large size solder joints 27 of a volume of about 0.4 cubic mm for a solder pad 37 about 1000 micro meters in diameter. The resulting height of large size solder joints 27 were about 700 micro meters. The size of medium size solder joints 26 was selected to be of a volume of about 11.4×106 cubic micro meters for a solder pad 36 about 500 micro meters in diameter. The small size solder joints 25 were about 100 micro meters in diameter. The solder used in an embodiment of the invention was a utectic tin/lead solder.

Figure 8A:
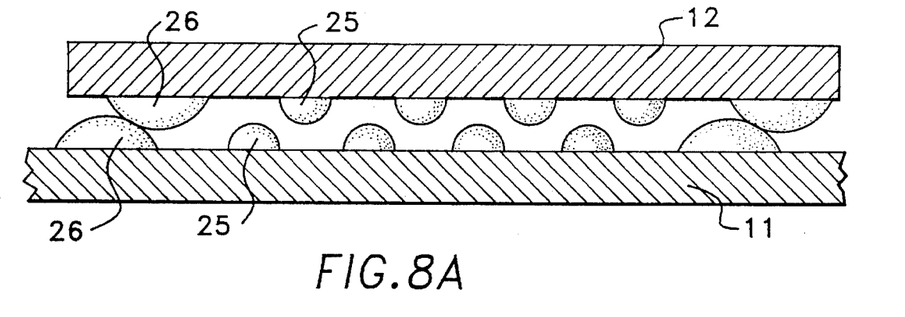
FIGS. 8A, 8B and 8C illustrate how solder reflow produces two-step horizontal alignment of the VSLI chip of FIG. 1 to the substrate member of that figure.
Figure 8B:
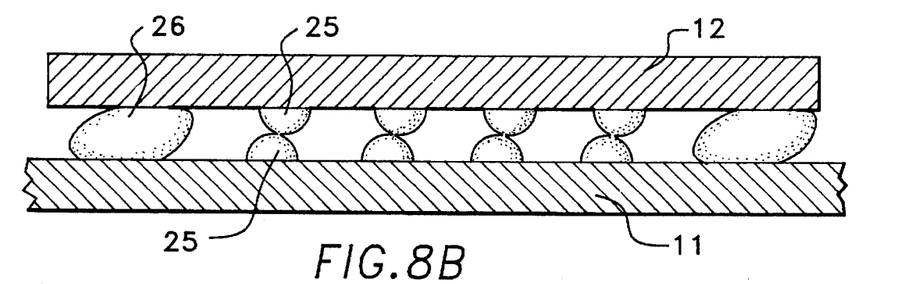

Relative to the alignment of chip 12 to substrate member 11, and with reference to FIGS. 8A, 8B and 8C, placing chip 12 on substrate 11 manually caused the four medium size solder joints 26 that are carried by both chip 12 and substrate 11 to touch each other (see FIG. 8A) and during solder reflow, to initiate self alignment by moving closer together the thirty-six small size solder joints 25 that are also carried by both chip 12 and substrate 11. Once the small size solder joints 25 touch (see FIG. 8B), they operate to start the micro meter level alignment of chip 12 to substrate member 11.

Figure 8C:
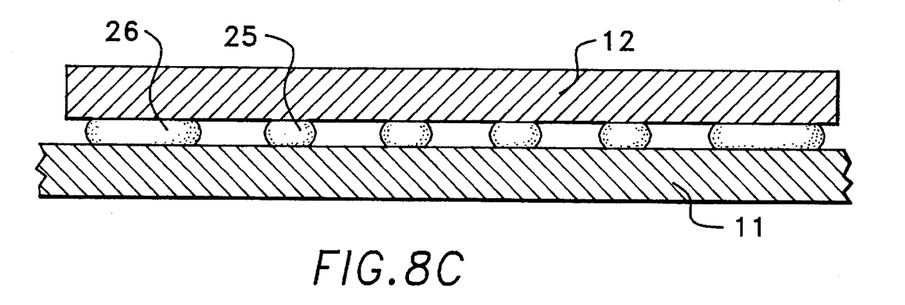

In order for this alignment procedure to work as described, it is desired that the sum of the top and bottom bump heights of medium solder joints 26 should be larger than the small solder joints 25; i.e., small joints 25 should not touch during manual placement of chip 12, as seen in FIG. 8A. In addition, the hot, collapsed, height of medium solder joints 26 after reflow should be less than the sum of the top and bottom bump heights of small solder joints 25; i.e., the small solder joint should now touch to begin micro meter self alignment, as seen in FIG. 8B. In addition, the collapsed height of medium solder joints 26 should be smaller than the height of a small solder joint 25 when in its spherical shape; i.e., the shape of small solder joints 25 when it has no vertical loading. This ensures that small solder joints 25 will, in fact, be lower than spherical and, as a result, they will be under compression, thus operating to push VLSI chip 12 upward relative to substrate member 11 as seen in FIG. 8C. In addition, the total restoring force of small solder joints 25 should be much larger than that generated by medium solder joints 26; i.e., micro level self alignment of chip 12 and substrate member 11 should be controlled by small solder joints 25.

Also, in an embodiment of the invention, a fluxless soldering process was preferred due to the fact that the use of flux in a solder process produces contaminants. The fluxless process preferred in accordance with the invention used optimum parameters of 280-degrees C for the hot paddle, and 2.5 liters per minute flow for the dry reacting forming gas which operated as a flux, preferably a $N_2/H_2$ forming gas, and more preferably a 90% $N_2$/10% $H_2$ forming gas. A hot paddle temperature of about 250-degrees C., with 7.5 liters per minute forming gas flow rate was also provided a satisfactory fluxless soldering process. The achieved surface tension coefficient of the resulting molten solder was about 400 dynes per cm, thus assuring that the developed solder joint was structurally as good as that achieved by soldering processes using flux.

By way of example, and without limitation thereto, the Z direction thickness of cover glass 13, directly above FLC layer 16, was in the range of about 2.0 to about 4 mm, spacers 17 extend in the range of about 1.0 to about 5.0 micrometers in the Z direction; for example, when spacers 17 were formed to be 2.0 micrometers, plus or minus 0.1 micrometer, the Z direction thickness of FLC layer 16 was in the range of about 1.7 micrometers to 2.3 micrometers.

Figure 2A:
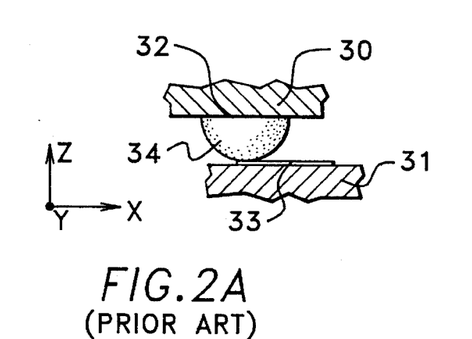
FIGS. 2a, 2b, and 2c show diagrammatically the operation of a known solder reflow force technique that operates to achieve device alignment, this technique being used in the present invention to align the VLSI chip of FIG. 1 to the underlying substrate member.
Figure 2B:
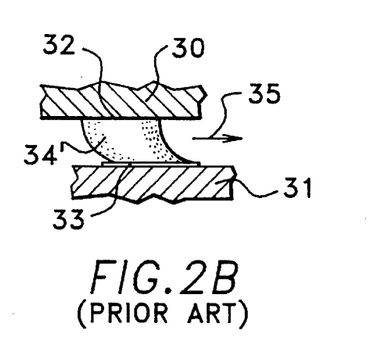
Figure 2C:
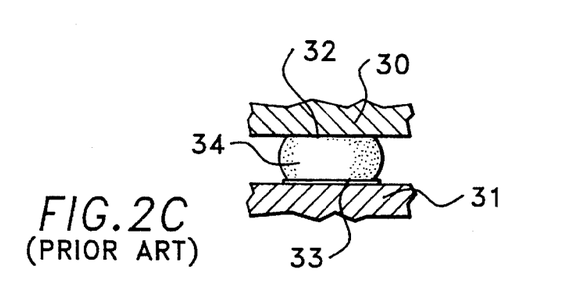

FIGS. 2a, 2b, and 2c show diagrammatically the operation of a solder reflow force that operates to achieve device alignment, as is known by those of skill in the art. Above-mentioned U.S. Pat. No. 4,867,543 also deals with the use of solder bumps to produce device alignment. This generally-known phenomenon is used in accordance with the invention to horizontally align cover glass 13 to substrate 11, and to align VLSI chip 12 to substrate 11.

In FIG. 2a, a first and a second physical device 30 and 31 are mounted in a fixture (not shown) so as to be closely vertically adjacent to each other, but to be out of a desired horizontal alignment, and to be easily horizontally movable relative to each other.

Solder wettable pads 32 and 33 have previously been placed, or coated, on the adjacent surface of devices 30 and 31, and a cool solder joint 34 has previously been placed on the pad that is carried by one of the devices by first heating solder joint 34 and then allowing it to cool on the pad; for example, solder joint 34 is thereby placed on pad 32 of device 30. As is known, precise alignment of devices 30 and 31 depends upon the accuracy with which wettable pads 32 and 33 are placed on these two devices.

In FIG. 2b, the arrangement of FIG. 2a has been heated such that solder joint 34 passes to a fluid state. In this state, the surface tension of solder joint 34 operates to generate a horizontal force, as is represented by arrow 35. This force 35 operates to move devices 30 and 31 in a horizontal direction relative to each other, and in the X-Y plane, until the symmetrical solder joint 34, shown in FIG. 2c, has been formed. As is well know, this movement is achieved by virtue of the principle of energy minimization.

FIG. 2c shows the rigidly coupled and aligned assembly of devices 30 and 31 after solder joint 34 has cooled.

Figure 3:
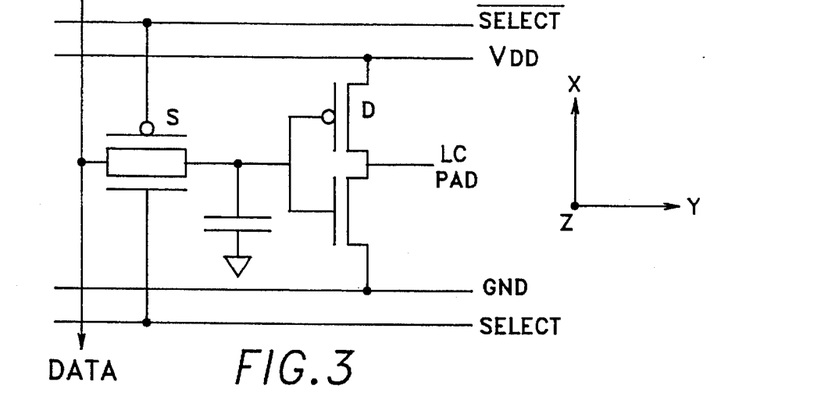
FIG. 3 is a circuit diagram of one of the pixel circuits of the VLSI chip of FIG. 1, wherein the VLSI chip comprised an X-Y coordinate system pixel array.

The individual pixel circuits that are carried by VLSI chip 12 are not critical to the invention. FIG. 3 is a circuit diagram of one of the pixel circuits used in an embodiment of the invention, wherein VLSI chip 12 comprised a 64×64, or larger pixel array, that was fabricated using a 2 micrometer, n-well, complementary metal oxide semiconductor process. In this circuit embodiment, each pixel of the array is addressed by the row/column intersection of a row data wire and a column-select wire. Each individual pixel driver transistor D controls the flow of an electrical charge from that transistor's data wire to that transistor's pixel LC pad or mirror, this electrical charge being under the control of that transistor's select (or gate) wire. SLMs of this type are sometimes described as DRAM devices, since they have a transistor at each pixel of the SLM.

The circuit at each VLSI and liquid crystal pixel comprises a semiconductor switch S and a semiconductor driver D. When the select line is high and the not-select line is low, the voltage on the data line is passed to the input capacitance of driver D. Driver D then drives, or charges, the VLSI's metal crystal modulating pad (LC pad 45 of FIG. 7). Subsequently, when the select line is low and the not-select line is high, the charge at the liquid crystal pixel is isolated, thus storing a data state at the liquid crystal pixel. Essentially, switch S acts as a switchable resistor that can be selectively changed from a low to a high resistance by the state of the select and not-select lines. The individual LC pads in this embodiment of the invention were about 32 micrometers square. As is known by those of skill in the art, the LC pads also act as pixel reflectors for the liquid crystal layer, these pads operating to reflect a reading wavefront from selectively modulated crystal pixels; for example, a reading wavefront that is generated by a 830nm laser.

Figure 7:
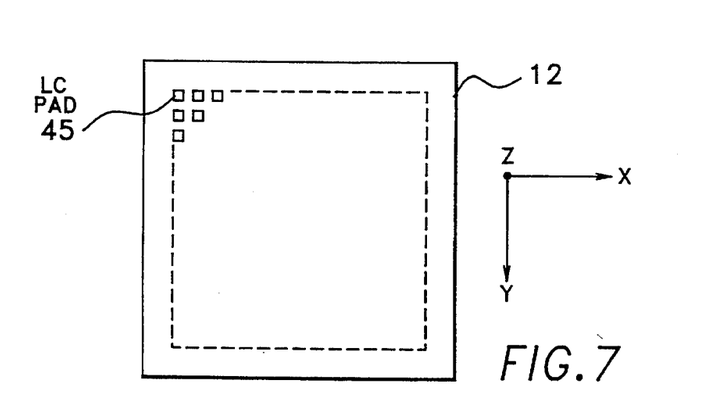
FIG. 7 is a top view of the VLSI chip shown in FIG. 1, showing the pixel arrangement of the LC pads to each of which a circuit of FIG. 3 is connected.

FIG. 7 is a top view of VLSI chip 12 in FIG. 1, showing the pixel arrangement of LC pads 45 to each of which a circuit of FIG. 3 is connected.

In this exemplary circuit configuration, the magnitude of the voltage Vdd was about 5 volts DC, and the magnitude of the voltage that was applied to the cover glass ITO layer 14 was about 2.5 volts DC. In this way, one surface of each liquid crystal pixel (i.e., the surface adjacent to an LC pad 45) is electronically programmed to be at either 0 volts or at about Vdd, as the other or opposite surface of all liquid crystal pixels are maintained generally midway between these two voltages (i.e., at about 2.5 volts).

FIG. 4 is a bottom view of cover glass 13. This figure shows in detail the four-sided channel or groove 22 that allows all four sides of VLSI chip 12 to be used to achieve wire bonding to the underlying substrate member, this being also illustrated in FIG. 4 by four-sided wire bond path 19.

FIG. 4 also shows a bottom view of liquid crystal cavity spacers 17 that operate to establish the Z direction thickness of liquid crystal cavity 18, these spacers extending along all four sides of cavity 18. The position of liquid crystal filling hole 20 is also shown.

FIG. 4 also shows the arrangement of the sixteen large size solder wettable 37 pads, and large size solder joints 27 that are used both to achieve alignment of cover glass 13 to substrate member 11 in the X-Y plane, and to also provide a downward Z direction force on cover glass 13, to thereby accurately establish the Z direction height of cavity 18 for liquid crystal layer 16.

Figure 5:
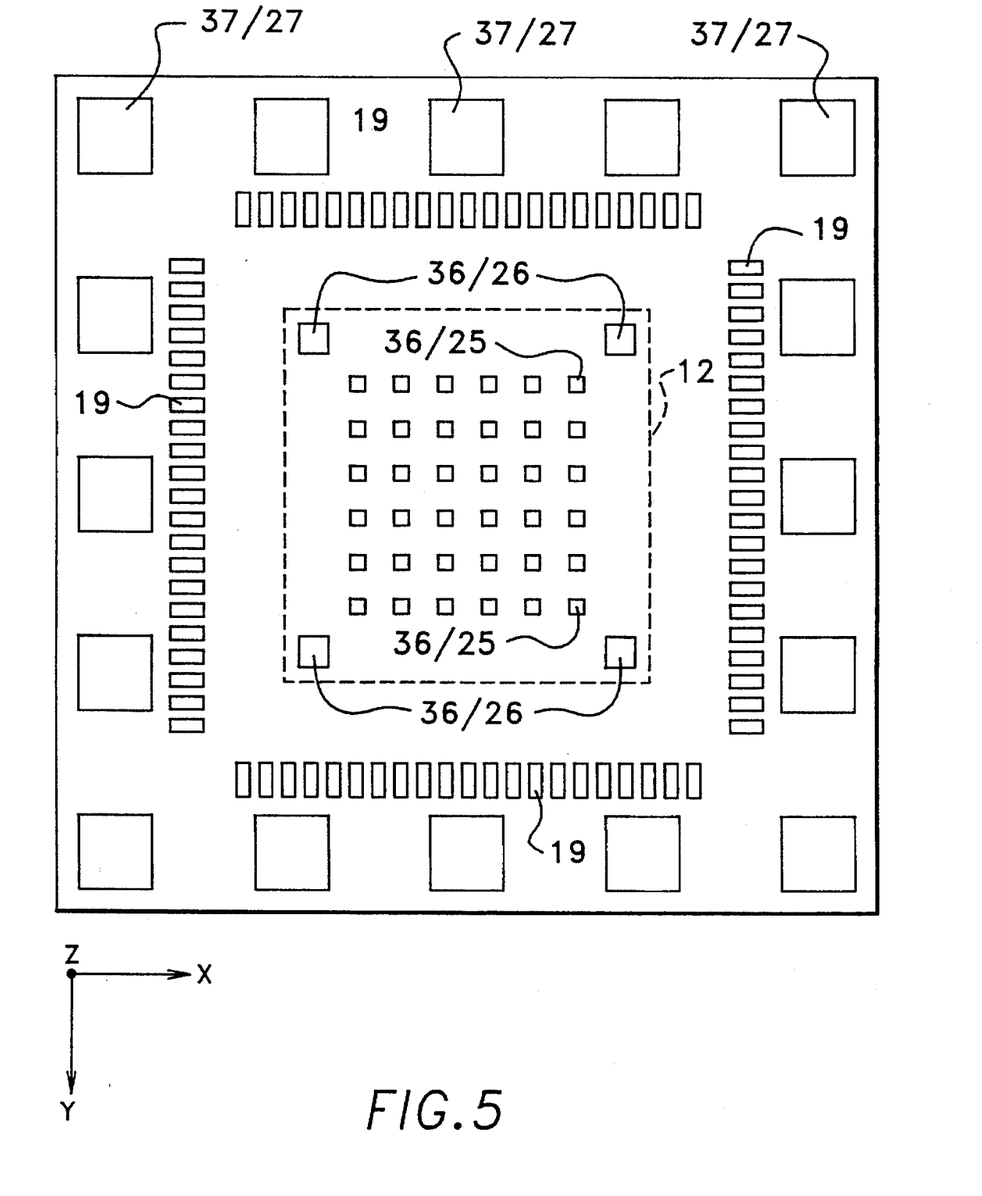
FIG. 5 is a top view of the substrate member shown in side section view in FIG. 1, showing (1) sixteen solder wettable pads and large size solder joints that are used to achieve alignment of the substrate member to the cover glass member, (2) the four solder wettable pads and medium size solder joints that are used to initiate alignment of the VLSI chip of FIG. 1 to the substrate member, (3) thirty six solder wettable pads and small size solder joints that are used to finalize alignment of the substrate member to the VLSI chip and to provide an upward-directed force on the VLSI chip to establish a cavity for the liquid crystal, and (4) the four-sided wire bond path that is used to connect the VSLI chip to the substrate member.

FIG. 5 is a top view of substrate member 11. This figure show sixteen large size solder wettable pads 37, and large size solder joints 27 that are used to achieve alignment of substrate member 11 to cover glass 13. This figure also shows four medium size solder wettable pads 36 and medium size solder joints 26 that are used to initiate alignment of VLSI chip 12 to underlying substrate member 11. Also shown are thirty-six small size solder wettable pads 36 and small size solder joints 25 that are used to finalize alignment of substrate member 11 to VLSI chip 12, and to also provide an upward Z direction force on VLSI chip 12 to establish cavity 18 for liquid crystal 16, as is the four-sided wire bond path 19 that is used to connect the circuits of FIG. 3 of VSLI chip 12 to substrate member 11.

Figure 6:
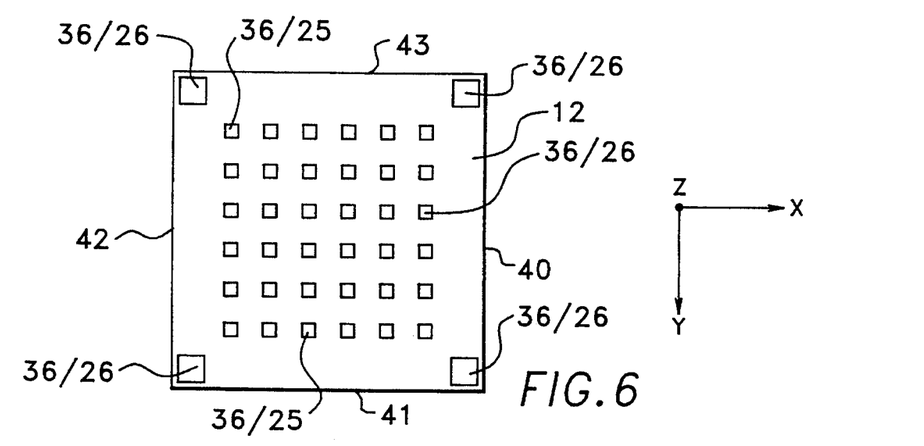
FIG. 6 is a bottom view of the VLSI chip shown in side section view in FIG. 1, showing (1) four solder wettable pads and medium size solder joints that are used to initiate alignment of the VLSI chip to the substrate member of FIG. 1, and (2) thirty six small size solder wettable pads and small size solder joints that are used to finalize alignment of the VLSI chip to the substrate member and to provide an upward-directed force on the VLSI chip to establish a cavity for the liquid crystal.

FIG. 6 is a bottom view of VLSI chip 12. This figure shows four medium size solder wettable pads 36 and medium size solder joints 26 that are used to initiate alignment of VLSI chip 12 to substrate member 11, as well as thirty-six small size solder wettable pads 36 and small size solder joints 26 that are used to finalize alignment of VLSI chip 12 to substrate member 11, and to also provide an upward Z direction force on VLSI chip 12 to establish cavity 18 for liquid crystal 16.

A process of making FLC/VLSI SLM 10 is as follows. First, the bottom surface of cover glass 13 is worked, drilled, ultrasonically machined, or the like, to form four-sided channel 22.

As a feature of the invention, an ultrasonic machining process is performed by first coating the bottom surface of cover glass 13 with a protective coating. Ultrasonic energy is then used to form channel 22, and thereafter the protective coating is removed from the remainder of the bottom surface of cover glass 13.

A thin layer, or coating 14 of ITO, is then applied to the bottom surface of the cover glass, and large size solder pads 37 are plated thereon. Polyimide spacers 17 are then developed on this surface of cover glass 13, and $SiO_x$ alignment layer 15 is obliquely evaporated on the active area of cover glass 13; i.e., in the area of cover glass 13 that is immediately above VLSI chip 12.

Substrate 11 is now prepared by developing and metalizing the circuit pattern (not shown) that is carried by the upper surface of substrate 11.

The bottom side of VLSI chip 12 (i.e., the side adjacent to substrate 11) is now developed and metalized to form medium size and small size solder pads 36.

VLSI chip 12 is now soldered onto substrate 11. Chip 12 is now accurately aligned in the X-Y plane with substrate 11. Electrical wire bonding 19 of chip 12 to substrate now occurs.

Cover glass 13 is now soldered to substrate 11. The vertical, or Z direction height of FLC cavity 18, is now accurately established. Filling hole 20 is now filled with a quantity of FLC paste.

This assembly of parts is now placed in a vacuum environment and heated. As a result, FLC material flows into cavity 18. Hole 20 is now sealed to complete the making of SLM 10.

In summary, FLC/VLSI SLM 10 of the invention uses solder technology to achieve both horizontal self alignment of the various SLM parts, and vertical force loading of these parts. Cover glass 13 is pushed down onto spacers 17, as VLSI chip 12 is pushed up on these spacers. Thus, control of the thickness of FLC layer 16 by spacers 17 is ensured. Once a solder joint height is determined for large, medium and small size solder joints 27,26,25, the solder joint shape and surface that is produced during solder reflow is determined by controlling the volume that is selected for each solder joint; i.e., preferably solder spheres of 100, 500 and 1000 micro meters diameter, respectively. Cover glass 13 is configured, as by the use of four-sided channel 22, to facilitate the use of all four sides 41,42,43,44 of VLSI chip 12 (see FIG. 6) to provide wire bonding of chip 12 to substrate member 11.

As a feature of the invention, the use of small, medium and large solder joints 25, 26 and 27 ensure that an adequate compression force is generated between substrate member 11 and cover glass 13. As these three types of solder joints cool (for example, from about 183° C. to room temperature), all three types of solder joints shrink; i.e., they reduce in the Z direction height shown in FIG. 1. However, since large solder joints 27 are higher than solder joints 25,26, shrinkage of large solder joints 27 is greater and, as a result, a compression force is generated between substrate member 11 and cover glass 13. This compression force operates to compress all of the SLM members 13, 17, 12, 25, 26, and 11 together in the Z direction.

The invention has been described making reference to a SLM having a single VLSI chip. It is, however, within the spirit and scope of the invention to use the same to produce multi-chip modules having two or more VSLI chips that are accurately located relative to a single underlying substrate member and a single overlying cover glass, or relative to an individual overlying cover glass for each SLM, by the use of the techniques taught herein. Such multi-chip modules have utility, for example, in optical correlators.

While the invention has been described in detail while making reference to various embodiments thereof, it is recognized that those skilled in the art will, upon learning of this invention, readily visualize yet other embodiments that are within the spirit and scope of this invention. Thus, this detailed description is not to be taken as a limitation on the spirit and scope of the invention.

What is claimed is:

1. A liquid crystal spatial light modulator, comprising;

a substrate member having a generally flat upper surface, a semiconductor chip having at least one liquid crystal modulating circuit thereon, said semiconductor chip having a generally flat upper surface and a generally flat lower surface that is spaced from said upper surface of said substrate member, means mounting said semiconductor chip on said upper surface of said substrate member, in spaced relation to said upper surface of said substrate member, and with said lower surface of said semiconductor chip spaced above said upper surface of said substrate member, a cover glass having a generally flat lower surface, liquid crystal cavity spacer means, a plurality of solder joints mounting said cover glass on upper surface of said substrate member with said liquid crystal spacer means confined between said lower surface of said cover glass and said upper surface of said semiconductor chip, to thereby define a liquid crystal cavity between said upper surface of said semiconductor chip and said lower surface of said cover glass, and a liquid crystal layer in said liquid crystal cavity, each of said plurality of solder joints being of generally the same volume, said volume being selected to ensure solder joint shrinkage upon cooling of said solder joints.

2. The modulator of claim 1 including;

wire bond means connection said at least one liquid crystal modulating circuit to said substrate member, and an upward-extending channel formed in said lower surface of said cover glass and operable to physically accommodate said wire bond means.

3. The modulator of claim 1 including;

an electrically conductive and optically transparent film on said lower surface of said cover glass, and at least one crystal modulating metal pad on said upper surface of said semiconductor chip and in physical contact with a lower surface of said liquid crystal layer.

4. The modulator of claim 3 wherein said liquid crystal layer is a ferroelectric liquid crystal layer, and including;

liquid crystal alignment means associated with an upper surface of said ferroelectric liquid crystal layer.

5. The modulator of claim 4 including;

wire bond means connecting at least one liquid crystal modulating circuit to said substrate member, and an upward-extending channel formed in said lower surface of said cover glass operable to physically accommodate said wire bond means.

6. A liquid crystal spatial light modulator, comprising;

a rectangular substrate member having a generally flat upper surface, a four-sided semiconductor chip of a size smaller than said substrate member, said semiconductor chip having a plurality of liquid crystal modulating circuits thereon, said semiconductor chip having a generally flat upper surface and a generally flat lower surface, a first plurality of solder joints mounting said semiconductor chip generally centered on said upper surface of said substrate member in a manner such that four edge portions of said substrate member extend beyond said four sides of said semiconductor member, said semiconductor member being mounted in spaced relation to said upper surface of said substrate member with said lower surface of said semiconductor chip being spaced above said upper surface of said substrate member, a rectangular cover glass of generally the same size or a larger size than said substrate member, said cover glass having a generally flat lower surface, liquid crystal cavity spacer means, a second plurality of solder joints mounting said cover glass on said four edge portions of said substrate member with said liquid crystal spacer means confined between said lower surface of said cover glass and said upper surface of said semiconductor chip, to thereby define a liquid crystal cavity between said upper surface of said semiconductor chip and said lower surface of said cover glass, and a liquid crystal layer in said liquid crystal cavity.

7. The modulator of claim 6 including;
rectangular path wire bond means having four path legs, said wire bond means operating to connect said plurality of liquid crystal modulating circuits to said substrate member, each of said four wire bond path legs being associated with one side of said semiconductor chip and with a corresponding edge portion of said substrate member, and a rectangular and upward-extending channel having four legs formed in said lower surface of said cover glass and operable to physically accommodate said wire bond means, each of said four channel legs being associated with one of said four wire bond path legs.

8. The modulator of claim 6 including;
an electrically conductive and optically transparent film on said lower surface of said cover glass, and a plurality of pixel spaced crystal modulating metal pads on said upper surface of said semiconductor chip and in physical contact with a lower surface of said liquid crystal layer, each one of said modulating pads being connected to be controlled by an individual one of said plurality of liquid crystal modulating circuits.

9. The modulator of claim 8 wherein said liquid crystal layer is a ferroelectric liquid crystal layer, and including;
liquid crystal alignment means associated with an upper surface of said ferroelectric liquid crystal layer.

10. The modulator of claim 9 including;
rectangular path wire bond means having four path legs, said wire bond means operating to connect said plurality of liquid crystal modulating circuits to said substrate member, each of said four wire bond path legs being associated with one side of said semiconductor chip and with a corresponding edge portion of said substrate member, and a rectangular and upward-extending channel having four legs formed in said lower surface of said cover glass and operable to physically accommodate said wire bond means, each of said four channel legs being associated with one of said four wire bond path legs.

11. A method of making a liquid crystal spatial light modulator, comprising the steps of;
providing a substrate member having a first and a second pattern of solder wettable pads on an upper surface thereof, providing a semiconductor chip having an upper surface, having at least one liquid crystal modulating circuit means thereon, and having a third pattern of solder wettable pads on a lower surface, said first and third pattern of solder wettable pads being of generally identical physical configuration, positioning said semiconductor chip above said substrate member with said first and third pattern of solder wettable pads generally in alignment, providing a first plurality of solder joints between said semiconductor chip and said substrate member, and in general alignment with said first and third pattern of solder wettable pads, heating said first plurality of solder joints such that solder reflow forces produce a desired alignment of said semiconductor chip to said substrate member, and such that said first plurality of solder joints operate to support said semiconductor chip above said upper surface of said substrate member, providing a cover glass having a fourth pattern of solder wettable pads on a lower surface thereof, said second and fourth pattern of solder wettable pads being of generally identical physical configuration, positioning said cover glass above said substrate member with said second and fourth pattern of solder wettable pads generally in alignment, providing a second plurality of solder joints between said cover glass and said substrate member, and in general alignment with said second and fourth pattern of solder wettable pads, providing a plurality of spacer means intermediate said cover glass and said upper surface of said semiconductor chip, heating said second plurality of solder joints such that solder reflow forces produce a desired alignment of said cover glass to said substrate member, and such that said solder reflow forces operate to force said cover glass downward onto said spacer means, so as to establish a liquid crystal cavity between said lower surface of said cover glass and said upper surface of said semiconductor chip, and injecting a liquid crystal material into said liquid crystal cavity.

12. The method of claim 11 wherein said heating steps comprise;
heating to a temperature in the range of from about 250 to 280-degrees C., and in the presence of a fluxless forming gas.

13. The method of claim 12 wherein the flow rate of said forming is in the range of about 2.5 to 7.5 liters per minute.

14. The method of claim 13 wherein said forming gas is an $N_2/H_2$ forming gas.

15. The method of claim 14 wherein said $N_2/H_2$ forming gas is about 90% $N_2$ and about 10% $H_2$.

16. The method of claim 11 wherein said first plurality of solder joints comprise solder joints having a volume of about $11.4 \times 10^6$ cubic micro meters.

17. The method of claim 16 wherein said second plurality of solder joints comprise solder joints having a volume of about 0.4 cubic mm.

18. The method of claim 17 wherein said heating steps comprise;
heating to a temperature in the range of from about 250 to 280-degrees C., and in the presence of a fluxless forming gas.

19. The method of claim 18 wherein the flow rate of said forming is in the range of from about 2.5 to about 7.5 liters per minute.

20. The method of claim 19 wherein said forming gas is an $N_2/H_2$ forming gas.

21. The method of claim 20 wherein said $N_2/H_2$ forming gas is about 90% $N_2$ and about 10% $H_2$.

22. A spatial light modulator, comprising;
a substrate member having a first, second and third pattern of solder wettable pads on an upper surface thereof, a semiconductor chip having an upper surface, having a plurality of liquid crystal modulating circuits on said upper surface, having a like plurality of liquid crystal modulator pads on said upper surface, said modulator pads being arranged in a pixel pattern to define a pixel configuration for said spatial light modulator, each of said modulator pads being connected to be controlled by one of said liquid crystal modulating circuits, said semiconductor chip having a lower surface, and said semiconductor chip having a fourth and a fifth pattern of solder wettable pads on a lower surface, said second and fourth pattern of solder wettable pads being of generally identical physical configuration, said third and fifth pattern of solder wettable pads being of generally identical physical configuration, said semiconductor chip being positioned above said substrate member with said second and fourth pattern of solder wettable pads generally in alignment, and with said third and fifth pattern of solder wettable pads generally in alignment, a first plurality of solder joints between said semiconductor chip and said substrate member, and in general alignment with said second and fourth pattern of solder wettable pads, a second plurality of solder joints between said semiconductor chip and said substrate member, and in general alignment with said third and fifth pattern of solder wettable pads, a cover glass having a sixth pattern of solder wettable pads on a lower surface thereof, said first and and sixth pattern of solder wettable pads being of generally identical physical configuration, said cover glass being positioned above said substrate member with said first and sixth pattern of solder wettable pads generally in alignment, a third plurality of solder joints between said cover glass and said substrate member, and in general alignment with said first and sixth pattern of solder wettable pads, a plurality of individual spacers intermediate said cover glass and said upper surface of said semiconductor chip, and a liquid crystal intermediate said cover glass and said upper surface of said semiconductor chip.

23. The spatial light modulator of claim 22 wherein said first plurality of solder joints are about 1000 micro meters in diameter, said second plurality of solder joints are about 100 micro meters in diameter, and said third plurality of solder joints are about 500 micro meters in diameter.

24. The spatial light modulator of claim 22, including;

wire bond means connecting said plurality of liquid crystal modulating circuits to said substrate member, and an upward-extending channel formed in said lower surface of said cover glass and operable to physically accommodate said wire bond means.

25. The spatial light modulator of claim 24 wherein said crystal modulating pads are reflective metal pads, and including;

an electrically conductive and optically transparent film on said lower surface of said cover glass.

26. The spatial light modulator of claim 25 wherein said liquid crystal is a ferroelectric liquid crystal, and including;

liquid crystal alignment means associated with an upper surface of said ferroelectric liquid crystal.

27. A method of making a spatial light modulator, comprising the steps of;

providing a generally rectangular substrate member having a generally flat and horizontal upper surface of a given area, providing a generally rectangular semiconductor chip having an upper horizontal surface of an area less than said given area, having a lower horizontal surface of said area less than said given area, and having at least one liquid crystal modulating circuit means, positioning said semiconductor chip above said substrate member, providing a first plurality of solder joints between said semiconductor chip and said substrate member, said first plurality of solder joint being of a relatively small size diameter, providing a second plurality of solder joints between said semiconductor chip and said substrate member, said second plurality of solder joint being of a relatively medium size diameter, heating said first and second plurality of solder joints such that solder reflow forces produce horizontal alignment of said semiconductor chip and said substrate member, and such that said first and second plurality of solder joints support said lower surface of semiconductor chip above said upper surface of said substrate member, providing a cover glass, said cover glass having a generally flat and horizontal lower surface of generally said given area, positioning said cover glass above said substrate member, providing a third plurality of solder joints of relatively large diameter between said cover glass and said substrate member, providing a plurality of vertical spacers intermediate said lower surface of said cover glass and said upper surface of said semiconductor chip, heating said third plurality of solder joints such that solder reflow forces produce alignment of said cover glass and said substrate member, and such that said solder reflow forces force said cover glass downward onto said vertical spacer, so as to establish a liquid crystal cavity between said lower surface of said cover glass and said upper surface of said semiconductor chip, and injecting liquid crystal into said liquid crystal cavity.

28. The method of claim 27 wherein said heating steps comprise;

heating to a temperature in the range of from about 250 to 280-degrees C., and in the presence of a fluxless forming gas.

29. The method of claim 28 wherein the flow rate of said forming is in the range of about 2.5 to 7.5 liters per minute.

30. The method of claim 29 wherein said forming gas is $N_2/H_2$.

31. The method of claim 30 wherein said $N_2/H_2$ forming gas is about 90% $N_2$ and about 10% $H_2$.

32. The method of claim 27 including the steps of;

providing wire bond means connecting at least one said liquid crystal modulating circuit means to said substrate member, and providing a vertically-upward-extending space in said lower surface of said cover glass to physically accommodate said wire bond means.

33. The method of claim 32 including the step of;

providing an electrically conductive and optically transparent film on said lower surface of said cover glass.

34. The method of claim 33 including the step of;

providing liquid crystal alignment means associated with an upper surface of said liquid crystal.

35. The method of claim 34 wherein said heating steps comprise;

heating to a temperature in the range of from about 250 to 280-degrees C., and in the presence of a fluxless forming gas.

36. The method of claim 35 wherein the flow rate of said forming is in the range of about 2.5 to 7.5 liters per minute.

37. The method of claim 36 wherein said forming gas is $N_2/H_2$.

38. The method of claim 37 wherein said $N_2/H_2$ forming gas is about 90% $N_2$ and about 10% $H_2$.

* * * * *